United States Patent
Hakkaku et al.

(10) Patent No.: US 11,040,488 B2
(45) Date of Patent: Jun. 22, 2021

(54) BUILDING APPARATUS AND BUILDING METHOD

(71) Applicant: MIMAKI ENGINEERING CO., LTD., Nagano (JP)

(72) Inventors: Kunio Hakkaku, Nagano (JP); Tetsuya Katou, Nagano (JP); Yoshihiro Tanaka, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 463 days.

(21) Appl. No.: 15/908,813

(22) Filed: Mar. 1, 2018

(65) Prior Publication Data
US 2018/0250881 A1 Sep. 6, 2018

(30) Foreign Application Priority Data
Mar. 1, 2017 (JP) .............................. JP2017-037979

(51) Int. Cl.
| | |
|---|---|
| B29C 64/236 | (2017.01) |
| B33Y 30/00 | (2015.01) |
| B33Y 10/00 | (2015.01) |
| B29C 64/393 | (2017.01) |
| B29C 64/264 | (2017.01) |
| B29C 64/112 | (2017.01) |

(Continued)

(52) U.S. Cl.
CPC .......... *B29C 64/236* (2017.08); *B29C 64/112* (2017.08); *B29C 64/209* (2017.08); *B29C 64/264* (2017.08); *B29C 64/393* (2017.08); *B33Y 10/00* (2014.12); *B33Y 30/00* (2014.12); *B33Y 50/02* (2014.12)

(58) Field of Classification Search
CPC .................................................. B29C 64/236
See application file for complete search history.

(56) References Cited

U.S. PATENT DOCUMENTS

2016/0257120 A1* 9/2016 Yashima ............... B29C 64/112

FOREIGN PATENT DOCUMENTS

| JP | 2017-013552 | 1/2017 |
| JP | 2017013351 | 1/2017 |
| WO | 2005025838 | 3/2005 |

OTHER PUBLICATIONS

"Office Action of Japan Counterpart Application", dated Oct. 6, 2020, with English translation thereof, p. 1-p. 5.

* cited by examiner

*Primary Examiner* — Larry W Thrower
(74) *Attorney, Agent, or Firm* — JCIPRNET

(57) ABSTRACT

A building apparatus building a three-dimensional object includes: an inkjet head serving as an ejection head; and a scan driver. The scan driver causes the inkjet head to perform a main scanning operation and a sub scanning operation. In an operation of forming one layer, the scan driver causes the inkjet head to perform the main scanning operation a certain number of times Pn (Pn is an integer equal to or greater than two), for each position of the layer being built, and to form, as the one layer, a layer configured such that a plurality of blocks formed by performing the Pn main scanning operations are arranged in a row in a sub scanning direction. Each of the blocks includes an intermediate region and an end region. The manner of forming the end region in the corresponding block is differentiated between two layers continuously overlapping in the deposition direction.

13 Claims, 9 Drawing Sheets

(51) Int. Cl.
*B29C 64/209* (2017.01)
*B33Y 50/02* (2015.01)

BUILDING APPARATUS AND BUILDING METHOD

CROSS REFERENCE TO RELATED APPLICATIONS

This application claims the priority benefit of Japanese Patent Application No. 2017-037979, filed on Mar. 1, 2017. The entirety of the above-mentioned patent application is hereby incorporated by reference herein and made a part of this specification.

TECHNICAL FIELD

The present disclosure relates to a building apparatus and a building method.

BACKGROUND ART

Building apparatuses (3D printers) have been known, which build objects using inkjet heads (for example, see Japanese Unexamined Patent Publication No. 2017-13552). Color building apparatuses have also been known, which form color information on the surface of an object. In such building apparatuses, an object is built, for example, by additive manufacturing by successively adding a plurality of layers of ink formed by inkjet heads.

Patent Literature: Japanese Unexamined Patent Publication No. 2017-13552

SUMMARY

When an object is built by additive manufacturing using inkjet heads, individual layers of ink can be formed, for example, by applying the operation for printing a two-dimensional image in an inkjet printer. In this case, each individual layer of ink can be formed by a multi-pass method. The multi-pass method is a method of performing a preset number of main scanning operations at each position in the layer being formed. In this case, the operation of forming each individual layer of ink by the multi-pass method may be performed, for example, by performing a sub scanning operation with a feed amount of a constant pass width in the interval of main scanning operations, in the same manner as in the operation of the multi-pass method in an inkjet printer.

Unfortunately, when the operation of the multi-pass method is performed in this manner, an unnecessary range (unnecessary scan area) may be larger than the width of the object in the sub scanning direction, for the range in which the inkjet head is moved in the repeated sub scanning operations (the range in the sub scanning direction), in the operation of forming each individual layer of ink. When an object is built by additive manufacturing, in which many layers of ink are deposited, the presence of such unnecessary scan areas significantly increases the time required for building. There has been a demand for building an object by a more appropriate method. The present disclosure then aims to provide a building apparatus and a building method that can solve the problem above.

When individual layers of ink are formed by the multi-pass method in building an object, it is possible to employ an operation different from the multi-pass method widely performed in inkjet printers to print a two-dimensional image. More specifically, in this case, for example, the operation of the multi-pass method may be performed by a small-pitch sub scanning operation with a smaller feed amount, as explained as a small pitch pass method in Japanese Unexamined Patent Publication No. 2017-13552. In this case, for example, the small-pitch sub scanning operation is performed as the sub scanning operation performed while main scanning operations of the number of passes are performed, whereby part (block) of a layer of ink is formed with a smaller amount of movement of the inkjet head in the sub scanning direction. After main scanning operations of the number of passes are performed, a large-pitch sub scanning operation is performed in which a large distance corresponding to the width in the sub scanning direction (nozzle row length) of the nozzle row of the inkjet head is set as a feed amount, so that the inkjet head is moved to a position where the building material is ejected to form the next block. By repeating these operations, one layer of ink is formed. In this configuration, unnecessary scan areas can be reduced, for example, compared with when the sub scanning operation with a constant pass width is merely performed. Accordingly, for example, an object can be built more efficiently.

However, when a layer of ink is formed by the small pitch pass method, the resulting layer is configured such that blocks formed by main scanning operations of the number of passes are arranged in a row in the sub scanning direction, because of the operating characteristics. Thus, a small pitch pass and a large pitch pass, which are different in feeding dimension in the sub scanning direction, are mixed to cause great variation in position accuracy after passes, and feed variations are more noticeable compared with the multi-pass method in which a constant feeding dimension in the sub scanning direction is repeated. Consequently, the vicinity of the boundary between adjacent blocks is less continuous compared with the other region, and coarseness or strip-like projections or depressions may become noticeable. When building is performed by additive manufacturing, the boundaries between blocks overlap each other in the deposition direction, which may increase the effect of the boundary state. Moreover, when an object is built by a building apparatus that forms color information on the surface, the boundary state may appear in the form of color variation, density variation, or streaks and may be visually more noticeable compared with an object that simply represents a shape.

In this respect, the inventor of the subject application has found that the noticeability of the boundary between blocks of an object as a whole can be prevented by differentiating the manner of forming the end region of a block that forms a boundary between blocks, among layers. In this case, "differentiating the manner of forming the end region of a block, among layers" means, for example, differentiating the position, width, and the like of the end region among layers. The inventor of the subject application has conducted even more elaborate studies and found features necessary for achieving such an effect. This finding has led to completion of the present disclosure.

In order to solve the problem above, the present disclosure provides a building apparatus that builds a three-dimensional object by depositing layers of a building material in a deposition direction which is preset. The building apparatus includes an ejection head configured to eject the building material and a scan driver configured to cause the ejection head to perform a scanning operation of moving relative to the three-dimensional object being built. The scan driver causes the ejection head to perform, as the scanning operation, a main scanning operation of ejecting the building material while moving relative to the three-dimensional object being built in a main scanning direction orthogonal to the deposition direction and a sub scanning operation of moving relative to the three-dimensional object being built in a sub scanning direction orthogonal to the deposition direction and the main scanning direction. In an operation of forming one of the layers formed of the building material, the scan driver causes the ejection head to perform the main scanning operation a preset number of times Pn for each position of the layer being built, where Pn is an integer equal to or greater than 2. The ejection head has a nozzle row including a plurality of nozzles arranged in a row for ejecting the building material. When building the three-dimensional object at least having a size in the sub scanning direction larger than a nozzle row width that is a width of the nozzle row in the sub scanning direction, the scan driver causes the ejection head to form, as the one of the layers, a layer configured such that a plurality of blocks are arranged in the sub scanning direction. The blocks each are a region formed by performing the Pn main scanning operations. Each of the blocks that constitute one of the layers includes an intermediate portion of the block in the sub scanning direction and has an intermediate region and an end region. The intermediate region is a region that does not overlap in position with another block. The end region is a region at an end of the block in the sub scanning direction and that overlaps with an adjacent block in at least part of a range in the sub scanning direction. For at least part of the layers deposited in the deposition direction, a manner of forming the end region in a corresponding block is differentiated between two of the layers continuously overlapping in the deposition direction.

For example, this configuration can appropriately prevent the boundary portion between blocks in each layer of ink from becoming more noticeable because of overlapping of layers of ink. Accordingly, for example, a three-dimensional object can be built appropriately with higher accuracy. When a three-dimensional object has color information on the surface, color variation, density variation, and streaks can be made less noticeable.

Here, in this configuration, in order to build a three-dimensional object with higher accuracy, for example, it is preferable that the manner of forming an end region in the corresponding block be differentiated between two layers continuously overlapping, for all the layers that constitute the three-dimensional object. The corresponding block refers to, for example, a block at the shortest distance in the sub scanning direction. The manner of forming the end region in the corresponding block may be differentiated, for example, by shifting the position of the end region in the sub scanning direction for the corresponding block. Alternatively, for example, the width of the end region in the sub scanning direction may be differentiated for the corresponding block.

Alternatively, the manner of forming the end region may be differentiated, for example, by changing the setting of a pattern for ejecting the building material to each ejection position in the end region. In this case, the pattern for ejecting the building material to each ejection position in the end region is, for example, a pattern that selects an ejection position such that the end region is formed complementarily (in an interlaced manner) in forming adjacent two blocks.

The operation of forming the end region complementarily may be, for example, such that, for an ejection target region that is a region to which the building material is ejected from the inkjet head in the main scanning operations, an end portion in the sub scanning direction is changed in a jagged pattern or a wavy pattern along the main scanning direction, so that the end portion is non-parallel with the main scanning direction. In this case, for example, the manner of forming the end portion may be differentiated between two layers continuously overlapping in the deposition direction, for the ejection target region in the main scanning operation performed at a corresponding timing in forming the corresponding block. In this case, the main scanning operation performed at a corresponding timing is, for example, the main scanning operation in the same turn, of Pn main scanning operations performed to form one block. More specifically, the manner of forming the end portion may be differentiated, for example, by shifting the position of the end portion in the sub scanning direction or by differentiating the width in the sub scanning direction of the portion changed in a jagged pattern or a wavy pattern in the end portion.

The operation of the pass method performed in this configuration may be considered as, for example, the operation in the small pitch pass method. More specifically, the operation in the small pitch pass method is the operation of performing, as the sub scanning operation, a first sub-scan that is the sub scanning operation with a small feed amount (small pitch) and a second sub-scan that is the sub scanning operation with a large feed amount (large pitch). In this case, the feed amount is, for example, the amount of movement of the ejection head moving relative to the three-dimensional object being built during the sub scanning operation. In this case, for example, the first sub-scan is performed as the sub scanning operation performed in the interval of Pn main scanning operations performed for forming one block. The second sub-scan is performed before formation of the next block is started every time Pn main scanning operations are performed.

In this case, the feed amount (feed amount of a small pitch) in the first sub-scan may be set, for example, to a width smaller than the width obtained by dividing the nozzle row width by the number of passes Pn. More specifically, it is preferable that the feed amount in the first sub-scan be, for example, 20 times or less the nozzle interval in the nozzle row. The feed amount in the first sub-scan is preferably 10 times or less the nozzle interval. The feed amount (feed amount of a large pitch) in the second sub-scan may be set to, for example, a distance corresponding to the nozzle row width. In this case, the distance corresponding to the nozzle row width is, for example, the distance obtained by adjusting the nozzle width as necessary considering the feed amount of a small pitch.

For example, both of one direction and the other direction of the sub scanning direction may be used for the direction in which the ejection head is moved relative to the three-dimensional object in the first sub-scan. In this case, for example, one direction and the other direction of the sub scanning direction may be set alternately for the direction of relative movement of the ejection head, in the interval of Pn main scanning operations performed to form one block.

It is preferable that the position to start the initial main scanning operation in forming each layer may be set, for example, for each layer to be matched with the range in which the layer is formed. More specifically, in this case, it is preferable that the position of the ejection head in the sub scanning direction at the start of the initial main scanning operation be set to be matched with the range in the sub scanning direction of the region in which the layer is to be formed. In this case, "the position of the ejection head is matched" means, for example, that the position of the end of the nozzle row of the ejection head is matched. When a three-dimensional object is built by the small pitch pass method, the direction in which the ejection head is relatively moved in the second sub-scan performed with a large pitch may be differentiated among layers. In this case, for example, it is preferable that the direction of relative movement of the ejection head be alternately changed for each of the layers deposited.

In an aspect of the present disclosure, for example, a building method having the same features as described above may be used. Also in this case, for example, the similar effects as described above can be achieved. This building method may be considered as, for example, a method of manufacturing a three-dimensional object.

According to the present disclosure, for example, a three-dimensional object can be built with higher accuracy. In particular, for example, in a three-dimensional object having a color image on its surface, image quality is satisfactory.

BRIEF DESCRIPTION OF THE DRAWINGS

FIGS. 1A to 1C are diagrams illustrating an example of a building apparatus 10 according to an embodiment of the present disclosure, in which FIG. 1A illustrates an example of the configuration of the main part of the building apparatus 10, FIG. 1B illustrates an example of the configuration of a head 12 in the building apparatus 10, and FIG. 1C illustrates an example of the configuration of an object 50 built in the present example.

FIGS. 2A to 2C are diagrams illustrating the operation of forming a layer of ink by a multi-pass method, in which FIG. 2A illustrates an example of the operation of the multi-pass method, and FIGS. 2B and 2C schematically illustrate the operation of a small pitch pass method.

FIGS. 4A and 4B are diagrams illustrating a manner of forming two layers of ink continuously overlapping, in which FIG. 4A illustrates an example of the range in which the main scanning operations are performed, for the n-th layer and the (n+1)th layer that are two layers of ink continuously overlapping, and FIG. 4B illustrates an example of the range of two blocks 302a and 302b arranged in a row in the sub scanning direction, for the n-th layer and the (n+1)th layer.

FIGS. 5A and 5B are diagrams illustrating an example of the operation of a second sub-scan, in which FIG. 5A illustrates an example of the second sub-scan performed when one of two layers of ink continuously overlapping in the deposition direction is formed, and FIG. 5B illustrates an example of the second sub-scan performed when the other of two layers of ink continuously overlapping in the deposition direction is formed.

FIGS. 6A and 6B are diagrams illustrating a modification of how the second sub-scan is performed, in which FIGS. 6A and 6B illustrate an example of the second scan sub-scan in a forward path and a backward path in this modification.

FIGS. 7A to 7C are diagrams illustrating a modification of the manner of forming blocks, in which FIG. 7A illustrates a manner of forming blocks explained with reference to FIGS. 3A to 3C and FIGS. 4A and 4B, and FIGS. 7B and 7C illustrate a modification of the manner of foil ling blocks.

FIGS. 8A to 8C illustrate an example of the manner of forming an interlaced region 512 for a plurality of layers of ink deposited in succession, in which FIGS. 8A and 8B illustrate an example of the positions where individual main scanning operations are performed, for the main scanning operations performed when a layer of ink including a plurality of blocks 302a to 302c is formed, and FIG. 8C is an enlarged view schematically illustrating a portion denoted by a circle 602 in FIG. 8B.

FIG. 9B is a diagram illustrating the manner of forming a support layer 52 in more detail.

DESCRIPTION OF EMBODIMENTS

Figure 1A:
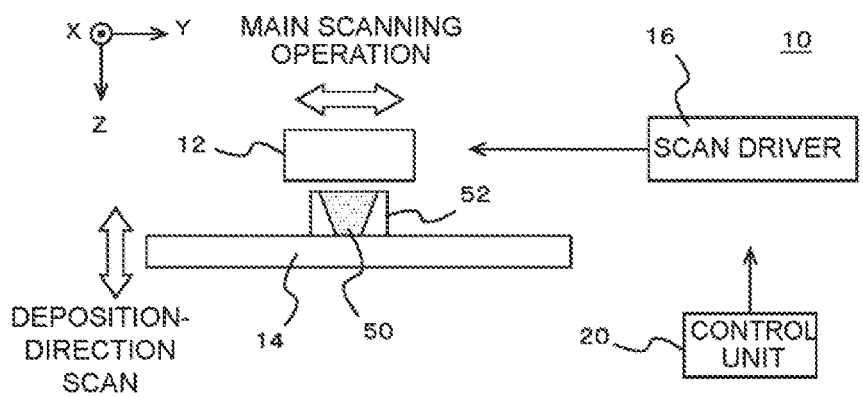
Figure 1B:
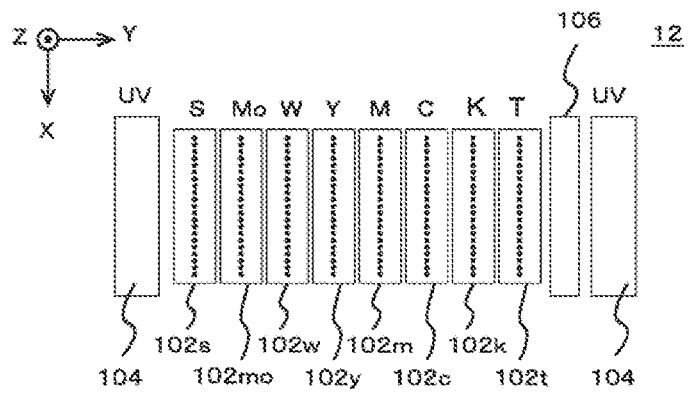
Figure 1C:
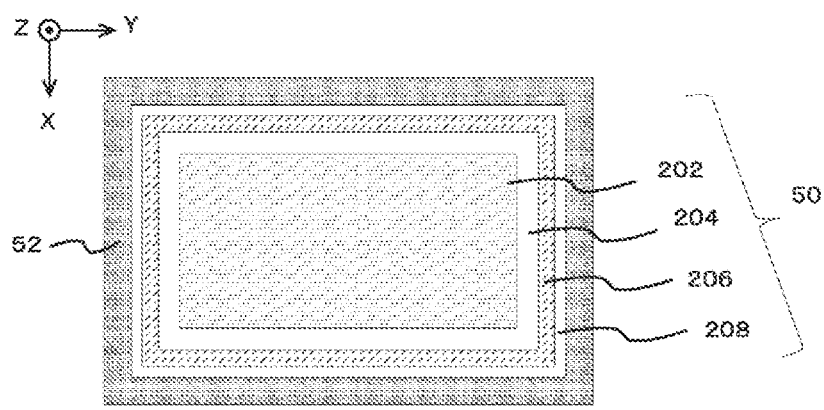

Embodiments according to the present disclosure are described below with reference to the drawings. FIGS. 1A to 1C illustrate an example of a building apparatus 10 according to an embodiment of the present disclosure. FIG. 1A illustrates an example of the configuration of the main part of the building apparatus 10. FIG. 1B illustrates an example of the configuration of a head 12 in the building apparatus 10.

The building apparatus 10 may have features identical or similar to those of known building apparatuses, except the points described below. More specifically, the building apparatus 10 may have features identical or similar to those of known building apparatuses that build an object by ejecting droplets serving as the material of an object 50 using inkjet heads, except the points described below. The building apparatus 10 may further include a variety of components, for example, necessary for building or coloring the object 50, in addition to the components illustrated in the figures.

In this example, the building apparatus 10 is a building apparatus (3D printer) that builds a three-dimensional object 50 by additive manufacturing. In this case, the additive manufacturing refers to, for example, a method of building the three-dimensional object 50 by depositing layers of a building material in a preset deposition direction. The object 50 refers to, for example, a three-dimensional three-dimensional structure. In the present example, the building apparatus 10 includes the head 12, a stage 14, a scan driver 16, and a control unit 20.

The head 12 is a part that ejects a material of the object 50. In the present example, ink is used as the material of the object 50. In this case, the ink refers to, for example, liquid ejected from an inkjet head. The inkjet head refers to, for example, an ejection head that ejects droplets of ink by inkjet technologies. More specifically, the head 12 ejects ink that hardens depending on a predetermined condition, as a material of the object 50, from a plurality of inkjet heads. The placed inkjet droplets are hardened whereby the layers of the object 50 are successively added. In this example, UV curable ink (UV ink) that hardens from a liquid state by application of ultraviolet rays is used as the ink.

The head 12 further ejects a material of a support layer 52, in addition to the material of the object 50. The head 12 thus forms the support layer 52 on the periphery of the object 50, if necessary. The support layer 52 refers to, for example, a layered structure that surrounds the outer periphery of the object 50 being built to support the object 50. The support layer 52 is formed as necessary during building of the object 50 and removed after completion of building. The more specific configuration of the head 12 will be described in detail later.

The stage 14 is a table-like member that supports the object 50 being built and is disposed at a position opposed to the inkjet heads in the head 12, and the object 50 being built is placed on the upper surface of the stage 14. In the present example, the stage 14 has a configuration in which at least its upper surface is movable in a deposition direction (Z direction in the figure), and is driven by the scan driver 16 such that at least the upper surface moves as the building of the object 50 proceeds. In this case, the deposition direction refers to, for example, a direction in which the building material is deposited in the additive manufacturing. More specifically, in the present example, the deposition direction is a direction orthogonal to the main scanning direction (Y direction in the figure) and the sub scanning direction (X direction in the figure).

The scan driver 16 is a driver that causes the head 12 to perform a scanning operation of moving relative to the object 50 being built. In this case, "moving relative to the object 50 being built" means, for example, moving relative to the stage 14. "Allowing the head 12 to perform a scanning operation" means, for example, causing the inkjet heads included in the head 12 to perform a scanning operation. In the present example, the scan driver 16 causes the head 12 to perform a main scanning operation (Y scan), a sub scanning operation (X scan), and a deposition-direction scan (Z scan).

The main scanning operation is, for example, the operation of ejecting ink while moving relative to the object 50 being built in the main scanning direction. In the present example, the scan driver 16 causes the head 12 to perform a main scanning operation by moving the head 12 while fixing the position of the stage 14 in the main scanning direction. In a modification of the configuration of the building apparatus 10, for example, the object 50 may be moved, for example, by moving the stage 14 while fixing the position of the head 12 in the main scanning direction.

As will be described in more detail later, in the present example, the head 12 further includes ultraviolet (UV) light sources. Then, during the main scanning operation, the scan driver 16 further drives the UV light sources in the head 12. More specifically, the scan driver 16, for example, turns on the UV light sources during the main scanning operation to harden ink droplets placed on the surface to be formed of the object 50. The "surface to be formed of the object 50" is, for example, a surface on which the next layer of ink is formed by the head 12.

The sub scanning operation is, for example, the operation of moving relative to the object 50 being built in the sub scanning direction orthogonal to the main scanning direction. More specifically, the sub scanning operation is, for example, the operation of moving relative to the stage 14 in the sub scanning direction by a preset feed amount. In this case, the feed amount refers to, for example, the amount of movement (the distance of relative movement) of the head 12 that moves relative to the object 50 being built during the sub scanning operation. The amount of movement of the head 12 is, for example, the amount of movement of the inkjet heads in the head 12.

In the present example, the scan driver 16 causes the head 12 to perform the sub scanning operation in the interval of the main scanning operations. In this case, the scan driver 16 causes the head 12 to perform the sub scanning operation, for example, by moving the stage 14 while fixing the position of the head 12 in the sub scanning direction. Alternatively, the scan driver 16 may cause the head 12 to perform the sub scanning operation by moving the head 12 while fixing the position of the stage 14 in the sub scanning direction.

In the present example, the building apparatus 10 builds the object 50 by the multi-pass method. In this case, the multi-pass method refers to a method in which a predetermined number of main scanning operations are performed on each position in the layer of ink being formed, in forming one of the layers of ink deposited to build the object 50. Then, in this case, the scan driver 16 causes the head 12 to perform the sub scanning operation at a preset timing and feed amount according to the number of passes in the multi-pass method. In this case, the number of passes refers to, for example, the number of times the main scanning operation is performed on the same position in forming one layer of ink. The number of passes may be considered as, for example, the number of main scanning operations necessary for filling a unit area in the layer of ink with a building material. The operation of the multi-pass method will be described in more detail later.

The deposition-direction scan is, for example, the operation of moving the head 12 in the deposition direction relative to the object 50 by moving at least one of the head 12 or the stage 14 in the deposition direction. In this case, "moving the head 12 in the deposition direction" means, for example, moving at least the inkjet heads in the head 12 in the deposition direction. "Moving the stage 14 in the deposition direction" means, for example, moving the position of at least the upper surface of the stage 14.

The scan driver 16 adjusts the relative position of the inkjet heads to the object 50 being built, in the deposition direction, by causing the head 12 to perform the deposition-direction scan as the building operation proceeds. More specifically, in the present example, the scan driver 16 moves the stage 14 while fixing the position of the head 12 in the deposition direction. The scan driver 16 may move the head 12 while fixing the position of the stage 14 in the deposition direction.

The control unit 20 is, for example, a central processing unit (CPU) of the building apparatus 10 and controls the building operation in the building apparatus 10 by controlling each part of the building apparatus 10. More specifically, the control unit 20 controls each part of the building apparatus 10, for example, based on shape information and color information of the object 50 to be formed. According to this example, the object 50 can be shaped appropriately.

The more specific configuration of the head 12 will now be described. In the present example, the head 12 includes a plurality of inkjet heads, a plurality of UV light sources 104, and a planarizing roller 106. Each of the plurality of inkjet heads is an example of the ejection head configured to eject a building material. More specifically, the head 12 includes, as a plurality of inkjet heads, an inkjet head 102*s*, an inkjet head 102*mo*, an inkjet head 102*w*, an inkjet head 102*y*, an inkjet head 102*m*, an inkjet head 102*c*, an inkjet head 102*k*, and an inkjet head 102*t*, as illustrated in FIG. 1B. These inkjet heads are, for example, aligned in the sub scanning direction and disposed in a row in the main scanning direction. Each inkjet head includes a nozzle row on the surface opposed to the stage 14. The nozzle row includes a plurality of nozzles arranged in a predetermined nozzle row direction for ejecting a building material. In the present example, the nozzle row direction is a direction parallel to the sub scanning direction.

Of these inkjet heads, the inkjet head 102*s* is an inkjet head ejecting the material of the support layer 52. In the present example, UV curable ink having a lower degree of curing by ultraviolet rays than the material of object 50 is used as the material of the support layer 52. The inkjet head 102*s* thus ejects UV curable ink serving as the material of the support layer 52 from the nozzles in the nozzle row. Preferably, for example, a water-soluble material that is soluble in water after building the object 50 is used as the material of the support layer 52. In this case, it is preferable to use a material that has a lower degree of curing than the material for forming the object 50 and is easily decomposed.

The inkjet head 102mo is an inkjet head ejecting a building material ink (Mo ink). In this case, the building material ink is, for example, ink dedicated to building for use in building the interior (interior region) of the object 50.

The interior of the object 50 may be formed using another color ink, in addition to the building material ink. For example, the interior of the object 50 may be formed using another color ink (for example, white ink, coloring ink), without using the building material ink. In this case, the inkjet head 102mo may be eliminated in the head 12.

The inkjet head 102w is an inkjet head ejecting white (W) ink. In the present example, white ink is an example of light-reflective ink and is used, for example, to form a region (light-reflective region) having a light-reflecting property in the object 50. This light-reflective region reflects light incident from the outside of the object 50, for example, when the surface of the object 50 is colored in full-color representation. The full-color representation refers to, for example, representation of colors with a possible combination of process color inks in the subtractive color model.

The inkjet head 102y, the inkjet head 102m, the inkjet head 102c, and the inkjet head 102k (hereinafter referred to as inkjet heads 102y to 102k) are inkjet heads for coloring for use in building a colored object 50. More specifically, the inkjet head 102y ejects yellow (Y) ink. The inkjet head 102m ejects magenta (M) ink. The inkjet head 102c ejects cyan (C) ink. The inkjet head 102k ejects black (K) ink. In this case, the colors Y, M, C, and K are an example of process colors for use in the full-color representation. The inkjet head 102t is an inkjet head ejecting clear ink. The clear ink refers to, for example, clear ink that is colorless and transparent (T).

The plurality of UV light sources 104 are light sources (UV light sources) for hardening ink and generate ultraviolet rays for hardening UV curable ink. In the present example, the plurality of UV light sources 104 are respectively disposed on one end side and the other end side of the main scanning direction in the head 12, with the rows of the inkjet heads interposed therebetween. For example, a UVLED (ultraviolet light emitting diode) can suitably be used as the UV light source 104. Alternatively, a metal halide lamp or a mercury vapor lamp may be used as the UV light source 104.

The planarizing roller 106 is planarizing means for planarizing the layer of ink formed during building of the object 50. The planarizing roller 106 comes into contact with the surface of the layer of ink and removes part of the ink before hardening, for example, during the main scanning operation, thereby planarizing the layer of ink. Using the head 12 having the configuration described above, the layer of ink that forms the object 50 can be formed appropriately. Furthermore, a plurality of layers of ink are successively added so that the object 50 can be built appropriately.

The specific configuration of the head 12 is not limited to the configuration described above and may be susceptible to various modifications. For example, the head 12 may further include, as inkjet heads for coloring, inkjet heads for colors such as pale colors, red (R), green (G), blue (B), and orange, in addition to the inkjet heads 102y to 102k. The arrangement of a plurality of inkjet heads in the head 12 is also susceptible to various modifications. For example, some of the inkjet heads may be displaced in the sub scanning direction from the other inkjet heads.

The configuration of the object 50 to be formed by the building apparatus 10 in the present example will now be described in more detail. FIG. 1C is a diagram illustrating an example of the configuration of the object 50 to be built in the present example and illustrates an example of the configuration in X-Y cross section, which is a cross section of the object 50 orthogonal to the deposition direction (Z direction), together with the support layer 52. In this case, a Z-X cross section or a Z-Y cross section of the object 50 vertical to the Y direction or the Z direction has a similar configuration.

As explained above, in the present example, the building apparatus 10 builds the object 50 colored at least on the surface, for example, using the inkjet heads 102y to 102k. In this case, the building apparatus 10 builds, for example, the object 50 having an interior region 202, a light-reflective region 204, a colored region 206, and a protective region 208, as illustrated in the figure. A support layer 52 is additionally formed on the periphery of the object 50 as necessary.

The interior region 202 is a region that forms the interior of the object 50. The interior region 202 may be considered, for example, as a region that forms the shape of the object 50. In the present example, the building apparatus 10 forms the interior region 202 using building material ink ejected from the inkjet head 102mo. The light-reflective region 204 is a light-reflective region for reflecting light incident from the outside of the object 50 through the colored region 206 and the like. In the present example, the building apparatus 10 forms the light-reflective region 204 on the periphery of the interior region 202, using white ink ejected from the inkjet head 102w.

The colored region 206 is a region colored by coloring inks ejected from the inkjet heads 102y to 102k. In the present example, the building apparatus 10 forms the colored region 206 on the periphery of the light-reflective region 204, using coloring inks ejected from the ink inkjet heads 102y to 102k and clear ink ejected from the inkjet head 102t. In this case, for example, various colors are represented by adjusting the amount of coloring ink of each color ejected to each position. The clear ink is used for compensating for variation in the amount of coloring ink due to color difference (the amount of emission per unit volume is 0% to 100%) to constant 100%. With such a configuration, for example, each position in the colored region 206 can be colored appropriately in a desired color.

The protective region 208 is a transparent region for protecting the outer surface of the object 50. In the present example, the building apparatus 10 forms the protective region 208 so as to cover the outside of the colored region 206, using the clear ink ejected from the inkjet head 102t. In the present example, the regions described above are formed so that the object 50 having the colored surface can be formed appropriately.

In a modification of the configuration of the object 50, the specific configuration of the object 50 may be different from the one described above. More specifically, for example, the interior region 202 and the light-reflective region 204 may not be distinctive from each other and, for example, an interior region 202 also serving as a light-reflective region 204 may be formed using white ink. Alternatively, part of the regions of the object 50 may be omitted. In this case, for example, the protective region 208 may be eliminated. For example, when the object 50 not colored is to be built, the regions other than the interior region 202 may be eliminated. Alternatively, a region other than those described above may be additionally formed in the object 50. In this case, for example, an isolation region may be formed between the light-reflective region 204 and the colored region 206. The isolation region is, for example, a transparent region for preventing mixing of white ink for forming the light-reflective region 204 and ink for forming the colored region 206. In this case, the building apparatus 10 forms an isolation region on the periphery of the light-reflective region 204, for example, using clear ink ejected from the inkjet head 102t.

The building operation by the multi-pass method performed in the building apparatus 10 in the present example will now be described in more detail. First of all, for convenience of explanation, the operation of a typical multi-pass method will be described.

Figure 2A:
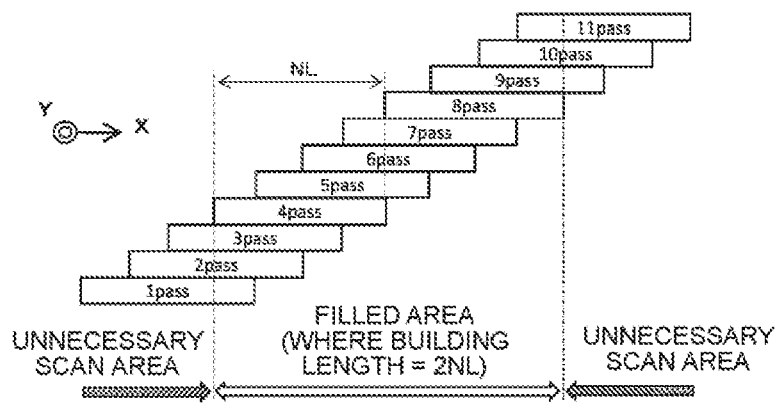
Figure 2B:
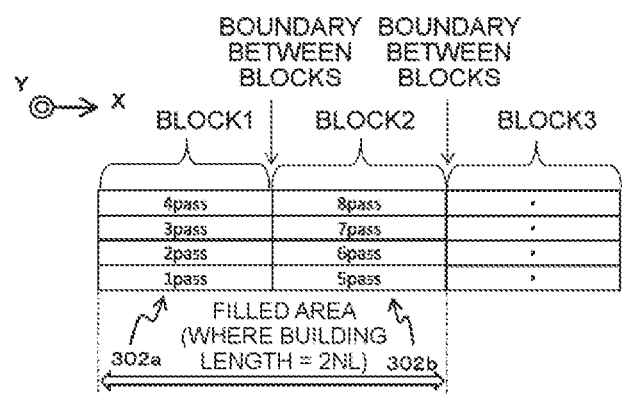
Figure 2C:
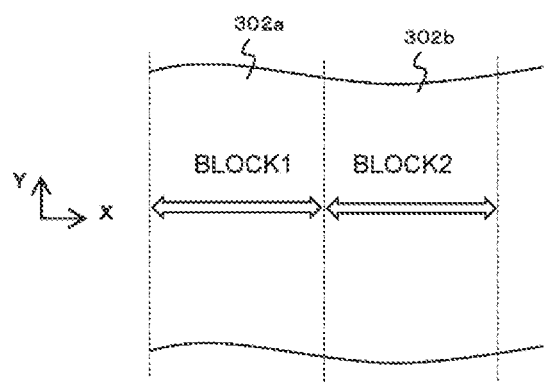

FIGS. 2A to 2C are diagrams illustrating the operation of forming a layer of ink in the multi-pass method. FIG. 2A is a diagram illustrating an example of the operation of the multi-pass method, specifically illustrating the operation of the typical multi-pass method conventionally performed.

In the operation of the multi-pass method illustrated in FIGS. 2A to 2C and subsequent figures, the position in the sub scanning direction of the inkjet head at a timing when each main scanning operation (pass) is performed is schematically illustrated. In the figure orthogonal to the main scanning direction, for the sake of illustration, the positions of the inkjet heads in the main scanning operations executed to form one layer of ink are shifted in the top-bottom direction in the figure. However, in the actual operation of the building apparatus 10, the positions are not shifted in the top-bottom direction in forming one layer of ink. In those figures, a plurality of inkjet heads in the head 12 (see FIGS. 1A to 1C) are illustrated as one inkjet head for the sake of simplicity. Such a way of illustration is applicable to FIGS. 3A to 3C, FIGS. 4A and 4B, FIGS. 7A to 7C, FIGS. 8A to 8C, etc. described later.

The operation of the multi-pass method illustrated in FIG. 2A is, for example, the operation similar to the multi-pass method (hereinafter referred to as the normal pitch pass method) widely used for inkjet printing for printing a two-dimensional image. The normal pitch pass method may be considered, for example, as a method of forming layers of ink deposited to build the object 50 (see FIGS. 1A to 1C), in the same manner as when printing is done by the multi-pass method in an inkjet printer.

More specifically, in FIG. 2A, when the width in the sub scanning direction (building length) of the object 50 (see FIGS. 1A to 1C) is twice a nozzle row width NL of the inkjet head, a layer of ink is formed by the multi-pass method, where the number of passes is four. In this case, the building length refers to, for example, the width in the sub scanning direction of the layer of ink being formed. The nozzle row width NL is the width in the sub scanning direction of the nozzle row in the inkjet head (the length of the nozzle arrangement).

When a layer of ink is to be formed by the normal pitch pass method, as illustrated in the figures, the inkjet head is moved relative to the object 50 in a predetermined direction of the sub scanning direction, by a distance NL/Pn, which is obtained by dividing the nozzle row width NL by a preset number of passes Pn (Pn is an integer equal to or greater than 2), every time one main scanning operation is performed (for each pass). Then, when a layer of ink is formed in this manner, if an attention is focused on a unit area of the layer of ink, the boundary between passes can be made less noticeable, because ink as a building material is filled by a uniform operation through a plurality of main scanning operations (passes). In this case, in general, as the number of passes Pn increases, the uniformness of the layer of ink becomes better. When a colored object 50 is built, the image quality of the colored surface also becomes better.

However, in this case, as can be understood from the state illustrated in the figure, the width in the sub scanning direction of the range in which the main scanning operations are performed (scan area) is larger than the building length, and the required number of main scanning operations increases. More specifically, as illustrated in the figure, when a layer of ink is formed by the normal pitch pass method, where the building length is 2NL and the number of passes Pn is four, eleven main scanning operations (passes) are required. In this case, however, the building material of the object 50 is only ejected to the area denoted as "filled area" in the figure, and there is a range (unnecessary scan area) in which the building material is not ejected, in a total of six main scanning operations at the front end and the rear end.

By contrast, the operation of the multi-pass method performed to build the object 50 may be performed by the small pitch pass method in which the sub scanning operation is performed with a smaller feed amount. FIGS. 2B and 2C schematically illustrate the operation of the small pitch pass method.

As explained below, the small pitch pass method is a method in which the feed amount in the sub scanning operation performed while the main scanning operations of the number of passes are performed is smaller than that in the normal pitch method. In FIGS. 2B and 2C, for the sake of simplification of illustration and explanation, the feed amount in the sub scanning operation performed while the main scanning operations of the number of passes are performed is zero. The operation in a case where this feed amount is set to an amount greater than zero will be described in more detail later. In the following, for convenience of explanation, the operation in the case where the feed amount is greater than zero will be incorporated in the description, if necessary.

Also when a layer of ink is formed by the small pitch pass method, the main scanning operations of the number of passes Pn are performed on each position in the layer, in the same manner as in the normal pitch pass method. More specifically, in this case, in the operation of forming one layer of ink formed by ink ejected from the inkjet heads in the head 12 (see FIGS. 1A to 1C), the scan driver 16 (see FIGS. 1A to 1C) causes the inkjet head to perform Pn main scanning operations on each position of the layer being build.

In this case, in the interval of the main scanning operations of the number of passes Pn, the inkjet head performs Pn main scanning operations on the substantially same range in the sub scanning direction, without performing the sub scanning operation with a large feed amount. Thus, the inkjet head forms a block that forms part of the layer of ink, in a range in which the range in the sub scanning direction corresponds to the nozzle row width NL of the inkjet head.

In this case, "the range corresponding to the nozzle row width NL" is, for example, a range in which the nozzle row width NL is adjusted by a small feed amount in the sub scanning operation performed during formation of the block. As illustrated in FIGS. 2B and 2C, when this feed amount is zero, the range corresponding to the nozzle row width NL is a range equal to the nozzle row width NL.

More specifically, in the case illustrated in FIGS. 2B and 2C, the operation by the small pitch pass method is performed, where the number of passes Pn is four. In this case, a first block (block 1), namely, a block 302*a* is formed by the first to fourth main scanning operations (1 to 4 passes).

When a layer of ink is formed by the small pitch pass method, if the building length is larger than the nozzle row width NL, a layer of ink is formed such that a plurality of blocks are arranged in a row in the sub scanning direction. In this case, after the first block 302a is formed, the sub scanning operation is performed with a large feed amount for changing the position of a block to be formed, so that the inkjet head is moved to a position where a second block (block 2), namely, a block 302b is to be formed. Then, at the changed position, the fifth to eighth main scanning operations (5 to 8 passes), which are main scanning operations of the number of passes Pn, are performed to form the block 302b. To build a larger object 50, the similar operation is repeated as necessary to form more blocks (block 3, and more).

In this way, also in the case of the small pitch pass method, if an attention is focused on a unit area, ink is filled in Pn main scanning operations, in the same manner as in the normal pitch pass method. However, if an attention is focused on the configuration of the layer of ink as a whole, in the case of the small pitch pass method, a layer is formed in units of blocks, unlike the normal pitch pass method.

In this case, as can be understood from the comparison between FIG. 2A and FIG. 2B, the number of main scanning operations required for forming one layer of ink can be reduced. More specifically, in the normal pitch pass method illustrated in FIG. 2A, eleven main scanning operations are required, whereas in the small pitch pass method illustrated in FIG. 2B, one layer of ink can be formed by eight main scanning operations. Accordingly, forming a layer of ink in a small pitch pass can reduce, for example, the time required for building.

However, when a layer of ink is formed by the small pitch pass method, for example, as illustrated in FIG. 2B, a boundary between blocks is formed. Such a boundary between blocks tends to be noticeable, for example, compared with a boundary between passes produced in the normal pitch pass method. More specifically, when a layer of ink is formed by the small pitch pass method, protrusions and depressions, color variation, and the like may occur at a joint between blocks. As a result, the joint may become noticeable in the form of a streak.

In this respect, as explained above, also when a layer of ink is formed by the small pitch pass method, the feed amount in the sub scanning operation performed while the main scanning operations of the number of passes are performed may not necessarily be set to zero, and the sub scanning operation with a small feed amount may be performed. With this configuration, the effect of the boundary between blocks can be reduced, for example, compared with when the small feed amount is set to completely zero.

Figure 3A:
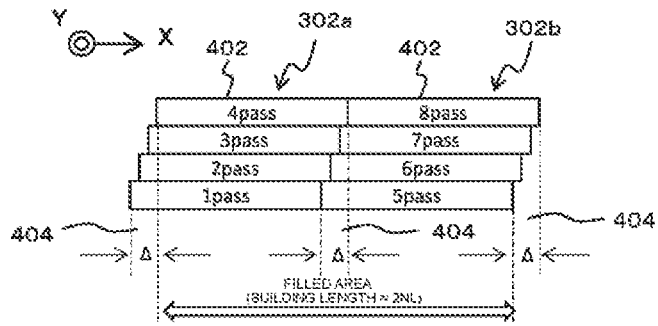
FIGS. 3A to 3C are diagrams illustrating the small pitch pass method in more detail, in which FIGS. 3A and 3B schematically illustrate an example of the operation of the small pitch pass method, and FIG. 3C schematically illustrates another example of the operation of the small pitch pass method.
Figure 3B:
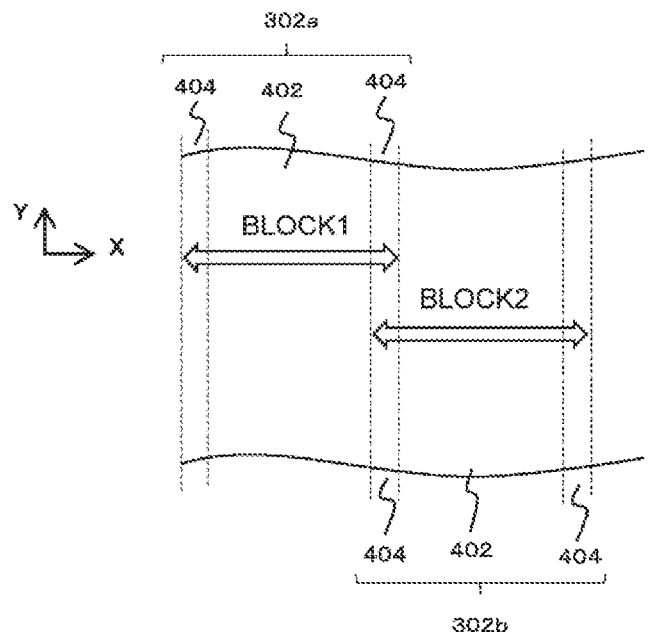
Figure 3C:
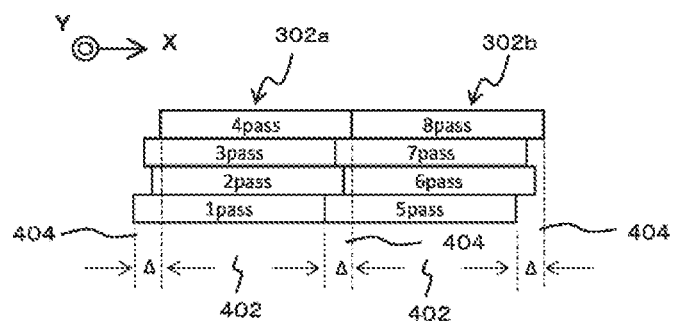

FIGS. 3A to 3C are diagrams illustrating the small pitch pass method in more detail. FIGS. 3A and 3B schematically illustrate an example of the operation of the small pitch pass method in a case where the small feed amount is set to a value other than zero.

In the operation illustrated in FIGS. 3A and 3B, a small feed amount in the small pitch pass method is set to a value other than zero, whereby the positions in the sub scanning direction are slightly shifted for the main scanning operations of the number of passes performed to form one block. An overlap portion is thus provided between blocks as denoted by a symbol in FIGS. 3A to 3C. In this configuration, for example, when compared with the case described with reference to FIGS. 2B and 2C, streaks, color variations, and the like produced in the boundary between blocks can be less noticeable.

More specifically, in this case, in the sub scanning operation performed in the interval of main scanning operations of the number of passes Pn performed to form one block (for example, block 302a), the sub scanning operation is performed with a small feed amount in one direction of the sub scanning direction. Each of the blocks such as the blocks 302a and 302b is formed to have an intermediate region 402 and end regions 404. In this case, the intermediate region 402 is an intermediate portion of the block in the sub scanning direction. As illustrated in FIG. 3B, in the present example, the intermediate region 402 is a region of which position in the sub scanning direction is included only in one block and that does not overlap with another block. The end region 404 is a region at an end of the block in the sub scanning direction. In the present example, the end regions 404 are one region and the other region of a block in the sub scanning direction and overlap with the adjacent block in at least part of the range in the sub scanning direction. "Overlapping with the adjacent block in at least part of the range in the sub scanning direction" means that, for example, a range in the sub scanning direction overlaps with both of the blocks 302a and 302b, as illustrated in the end region 404 between the block 302a and the block 302b.

When the operation of the small pitch pass method is performed in this way, the range in the sub scanning direction of the region that can be formed by the same number of main scanning operations is slightly narrower, for example, compared with the case illustrated in FIGS. 2B and 2C, due to the effect of performing the sub scanning operation with a small feed amount. For example, in the case illustrated in FIGS. 3A and 3B, the width of the filled area corresponding to eight main scanning operations is slightly smaller than 2NL. However, even in this case, an unnecessary scan area can be reduced appropriately by sufficiently reducing the feed amount in the sub scanning operation with a small feed amount. Accordingly, for example, compared with when building is performed by the normal pitch pass method, the time required for building can be reduced appropriately.

Here, as can be understood from the explanation above, the operation of the small pitch pass method can be considered as, for example, performing a first sub-scan and a second sub-scan, which are different kinds of sub scanning operations with different feed amounts, in the operation of forming one layer of ink. In this case, the first sub-scan is a sub scanning operation with a small feed amount (small pitch) performed in the interval of the main scanning operations of the number of passes Pn performed for forming one block. The second sub-scan is the sub scanning operation with a large feed amount (large pitch) performed after Pn main scanning operations for forming one block is performed and before a main scanning operation for forming the next block is performed.

In this case, the feed amount (feed amount of a small pitch) in the first sub-scan may be set, for example, to a width smaller than the width obtained by dividing the nozzle row width NL by the number of passes Pn (NL/Pn). More specifically, it is preferable that the feed amount in the first sub-scan be set, for example, to 20 times or less the nozzle interval in the nozzle row. In this case, the nozzle interval refers to, for example, the interval in the sub scanning direction between nozzles arranged in a nozzle row. The feed amount in the first sub-scan is preferably 10 times or less, more preferably 5 times or less the nozzle interval.

The feed amount in the second sub-scan (feed amount of a large pitch) may be, for example, a distance corresponding to the nozzle row width NL. In this case, the "distance corresponding to the nozzle row width" refers to, for example, a distance obtained by adjusting the nozzle width as necessary considering the feed amount in a small pitch.

More specifically, the feed amount in the second sub-scan may be, for example, a distance obtained by subtracting the width of the end region 404 (the width in the sub scanning direction) at one end of each block from the nozzle row width NL. In this case, the end region 404 at one end of each block may be, for example, larger than the product of the nozzle interval in the nozzle row (inter-nozzle pitch) and the number of passes Pn (nozzle interval·Pn) and smaller than the value obtained by dividing the nozzle row width NL by the number of passes Pn (NL/Pn).

In the foregoing, for the sub scanning operation with a small feed amount (first sub-scan), the operation of relatively moving the inkjet head in one direction of the sub scanning direction has been described with reference to FIGS. 3A and 3B. However, the sub scanning operation with a small feed amount performed while one block is formed by the small pitch pass method may not necessarily be performed only in one direction. For example, the sub scanning operation in one direction and the other direction of the sub scanning direction may also be used.

FIG. 3C is a diagram schematically illustrating another example of the operation of the small pitch pass method, specifically illustrating an example of the operation in a case where a bi-directional sub scanning operation (first sub-scan) is performed while one block is formed. Also in this case, for example, in the same manner as the case described with reference to FIGS. 3A and 3B, a first sub-scan which is a sub scanning operation with a small feed amount is performed in the interval of the main scanning operations of the number of passes (Pn) performed for forming one block. In this case, in the first sub-scan performed after one of Pn main scanning operations, the direction of the relative movement of the inkjet head is set to one direction of the sub scanning direction. In addition, in the first sub-scan performed after another of the main scanning operations, the direction of the relative movement of the inkjet head is set to the other direction of the sub scanning direction. Also in this configuration, the operation of the small pitch pass method can be performed appropriately. In this case, more specifically, the direction of the relative movement of the ink head in each first sub-scan may be set alternately to one direction and other direction of the sub scanning direction, as illustrated in the figure.

Here, as explained above, when a layer of ink is formed by the small pitch pass method, streaks and the like produced at the boundary between blocks can be made less noticeable, for example, compared with the case described with reference to FIGS. 2B and 2C, by forming the end region 404 at the end of each block. However, when building is performed by additive manufacturing, a plurality of layers of ink are successively added, and the end regions 404 in individual layers of ink overlap each other to make the boundary noticeable, although the boundary between blocks is less noticeable in a single layer of ink.

In this respect, the inventor of the subject application has conceived the idea of differentiating the manner of forming the end region 404 among layers, for a plurality of layers of ink deposited in the deposition direction. In this case, "differentiating the manner of forming the end region 404 among layers" means that, for example, for at least some of a plurality of layers of ink deposited, the manner of forming the end region 404 in the corresponding block is differentiated between two layers of ink continuously overlapping in the deposition direction. The corresponding block refers to, for example, a block at the shortest distance in the sub scanning direction. The distance between blocks in the sub scanning direction refers to, for example, the distance between reference positions, where the reference position is a predetermined position such as one end in the sub scanning direction.

In this case, it is preferable that the manner of forming the end region 404 in the corresponding block be differentiated between two layers of ink continuously overlapping in the deposition direction, for all the layers of ink deposited. At least some of a plurality of layers of ink deposited may be, for example, the layers of ink excluding some layers that have less effects on the appearance and the like, of all the layers of ink that constitute the object 50 (see FIGS. 1A to 1C).

Figure 4A:
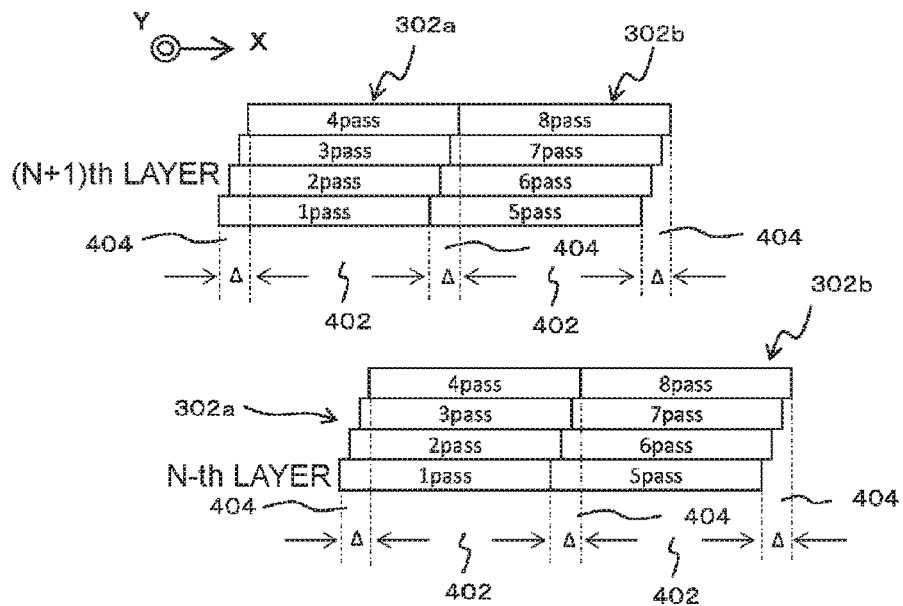
Figure 4B:
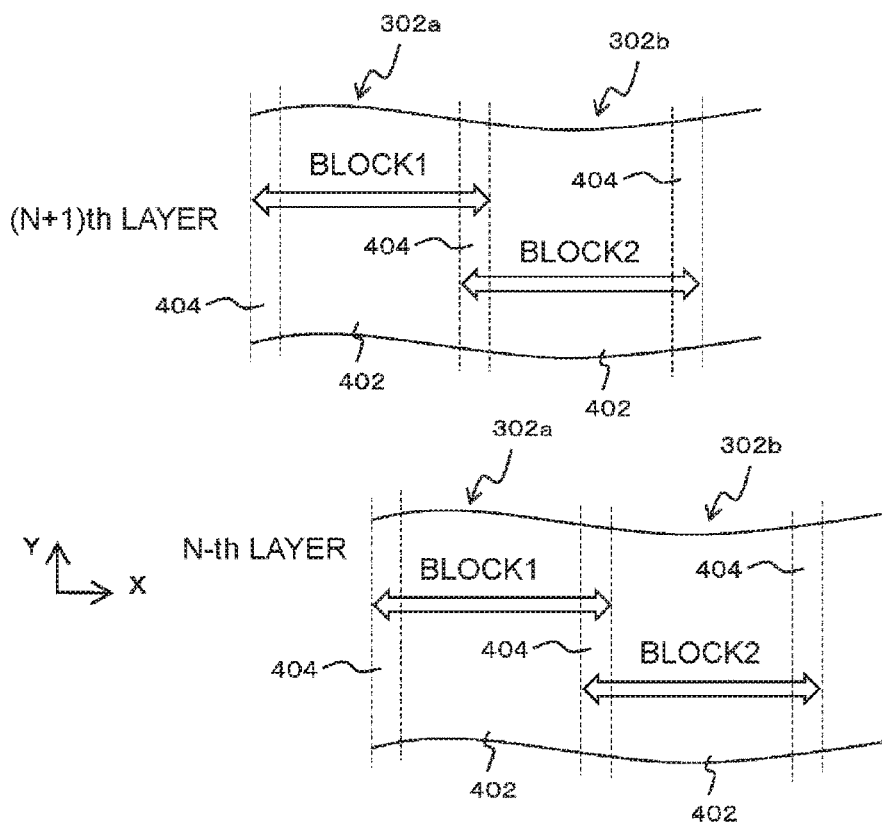

FIGS. 4A and 4B are diagrams illustrating the manner of forming two layers of ink continuously overlapping, specifically illustrating an example of how the manner of forming the end region 404 in the corresponding block is differentiated. FIG. 4A illustrates an example of the range in which the main scanning operations are performed (the range in the sub scanning direction), for the n-th layer and the (n+1)th layer (n is an integer equal to or greater than 1) that are two layers of ink continuously overlapping. FIG. 4B illustrates an example of the range of two blocks 302a and 302b arranged in a row in the sub scanning direction, for the n-th layer and the (n+1)th layer.

The n-th layer and the (n+1)th layer are, for example, the layers of ink deposited for the n-th time and the (n+1)th time, of the layers of ink deposited by additive manufacturing. In the case illustrated in the figure, for example, the relation between the block 302a that is the first block (block 1) in the n-th layer and the block 302a that is the first block (block 1) in the (n+1)th layer indicates the corresponding blocks between the two layers of ink continuously overlapping. In this case, the relation between the block 302b that is the second block (block 2) in the n-th layer and the block 302b that is the second block (block 2) in the (n+1)th layer also indicates the corresponding blocks between two layers of ink continuously overlapping.

In this case, "the manner of forming the end region 404 in the corresponding block is differentiated for two layers of ink continuously overlapping" means that, for example, the position (the position in the sub scanning direction) or the width (the amount of Δ) of the end region 404 is differentiated. More specifically, in this case, the manner of forming the end region 404 is differentiated between two layers of ink continuously overlapping in the deposition direction, for example, by shifting the position of the end region 404 in the sub scanning direction for the corresponding blocks. Alternatively, the manner of forming the end region 404 may be differentiated between two layers of ink continuously overlapping in the deposition direction, for example, by differentiating the width of the end region 404 in the sub scanning direction for the corresponding blocks.

For example, this configuration can prevent overlapping of the end regions 404 in the same state between the layers of ink continuously overlapping. This configuration can also appropriately prevent the boundary portions between blocks in individual layers of ink from becoming noticeable due to overlapping of the layers of ink. Thus, according to the present example, for example, the object 50 can be built appropriately with higher accuracy.

Figure 5A:
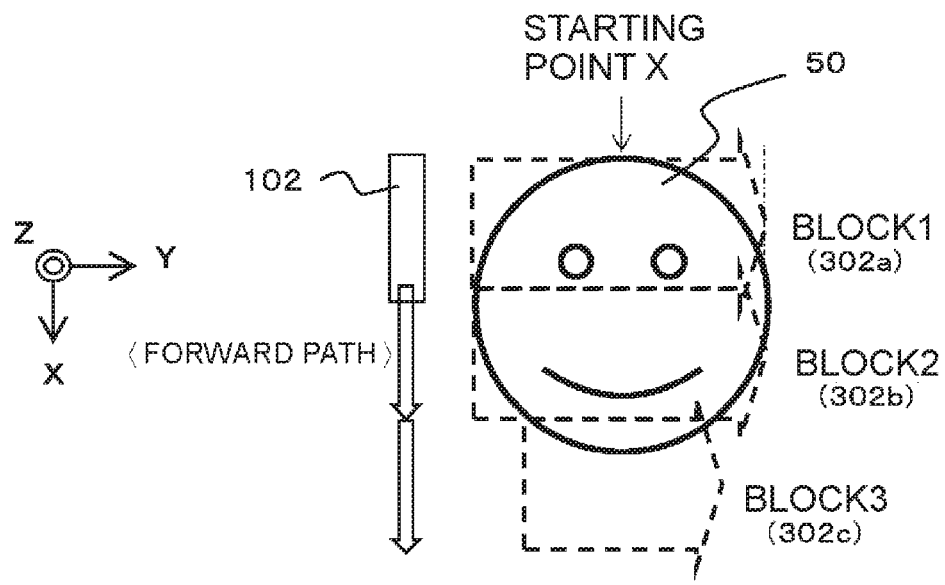
Figure 5B:
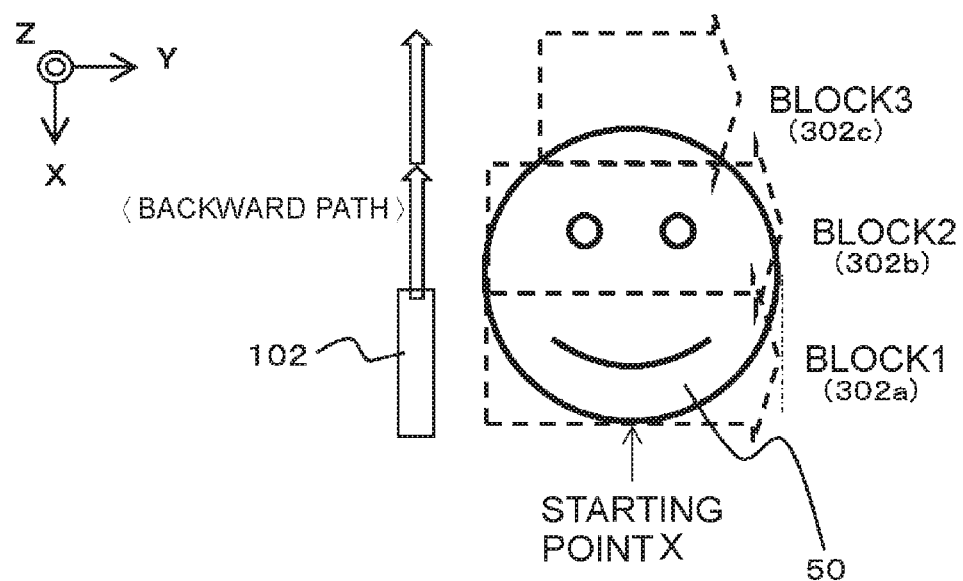

In connection with the operation of the small pitch pass method, an example of how the second sub-scan with a feed amount of a large pitch is performed will now be described. FIGS. 5A and 5B are diagrams illustrating an example of the operation of the second sub-scan.

As explained above, when a layer of ink is formed by the small pitch pass method, the second sub-scan is performed at a timing when a block to be formed is changed. The inkjet head is then moved to the position of the next block to be formed. Then, in this case, if performing building with easier control is considered, for example, the direction in which the inkjet head is relatively moved in the second sub-scan may be set only to one direction of the sub scanning direction.

However, the direction in which the inkjet head is relatively moved in the second sub-scan may be set, for example, bidirectionally, namely, both one direction and the other direction of the sub scanning direction. More specifically, in this case, for example, the direction of the second sub-scan may be alternately changed between one direction and the other direction of the sub scanning direction, for each individual layer of ink deposited. With this configuration, for example, at a timing when the formation of each layer of ink is started, the inkjet head can be moved to the initial position (starting point X) in the sub scanning direction in a shorter time. This configuration, for example, can further reduce the time required for building the object 50 and enables more efficient building of the object 50.

In this case, the direction of relative movement of the second sub-scan is differentiated, for two layers of ink continuously overlapping in the deposition direction, and, consequently, the manner of forming the layer of ink is differentiated. Accordingly, this configuration can also prevent, for example, overlapping of the end regions 404 in the same state between the layers of ink continuously overlapping, more appropriately.

More specifically, the bidirectional second sub scanning operation may be performed as illustrated in FIGS. 5A and 5B. FIG. 5A illustrates an example of the second sub-scan performed when one (the lower layer of ink) of two layers of ink continuously overlapping in the deposition direction is formed. In this case, the direction of the relative movement of the inkjet head 102 during the second sub-scan is set to one direction of the sub scanning direction, as denoted as "forward path" in the figures. A plurality of blocks 302a to 302c denoted as "blocks 1 to 3" in the figures are thus formed so as to be arranged in a row along the direction of this forward path. In FIGS. 5A and 5B, the scan range is matched with the object 50, for simplification of illustration and explanation. However, when the object 50 that requires formation of the support layer 52 is built, the scan range is matched with the range including the support layer 52.

In this case, in forming the next layer of ink, the direction of the relative movement of the inkjet head 102 in the second sub-scan is reversed. FIG. 5B illustrates an example of the second sub-scan performed when the other (the upper layer of ink) of two layers of ink continuously overlapping in the deposition direction is formed. In this case, the direction of the relative movement of the inkjet head 102 in the second sub-scan is set to the other direction of the sub scanning direction, as denoted as "backward path" in the figure, which is opposite to the case illustrated in FIG. 5A. A plurality of blocks 302a to 302c (blocks 1 to 3) are thus formed so as to be arranged in a row in the direction of this backward path. With such a configuration, for example, a bidirectional second sub-scan can be performed appropriately.

When building is performed by additive manufacturing, it is preferable that, in forming each individual layer of ink, the position (starting point X) of the inkjet head 102 in the sub scanning direction at the start of the initial main scanning operation be set to be matched with the range in the sub scanning direction of the region in which the layer of ink is to be formed. More specifically, in this case, as illustrated in the figures, the starting point X may be set to be matched with the position of the end of the object 50 in the sub scanning direction. In this case, "the position of the inkjet head 102 is matched" means that, for example, the position of the end of the nozzle row of the inkjet head 102 is matched. The end of the object 50 or the nozzle row refers to the upstream end in the direction of relative movement of the inkjet head 102 in the second sub-scan. In this configuration, for example, the range in the sub scanning direction of the region in which the main scanning operation is performed can be set more appropriately to be matched with the shape of the object 50. Accordingly, the object 50 can be built more efficiently.

In this case, it is preferable that the range in which the inkjet head 102 is moved in the main scanning operation performed when each individual block is formed (the range in the main scanning direction) be also set to be matched with the width in the main scanning direction of the object 50 to be shaped. In this case, "to be matched with the width in the main scanning direction of the object 50" means being matched with a range in which a layer of ink formed by the main scanning operation this time is formed (the range in the main scanning direction), of the layers of ink that constitute the object 50. More specifically, in this case, for example, when a block corresponding to a portion narrow in the main scanning direction of the object 50, such as the block 302c (block 3) in FIGS. 5A and 5B, is formed, the range in which the inkjet head 102 is moved in the main scanning operation may be narrowed. In this case, also when the blocks 302a and 302b (blocks 1, 2) are formed, it is preferable that the range in which the inkjet head 102 is moved be set to be matched with the width of the object 50 in the main scanning direction. In this configuration, the object 50 can be built more efficiently.

Figure 6A:
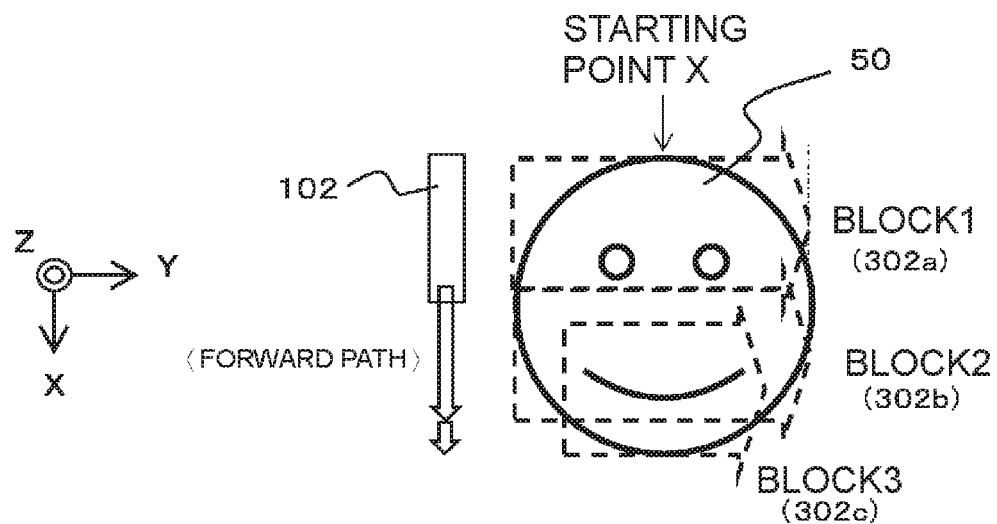
Figure 6B:
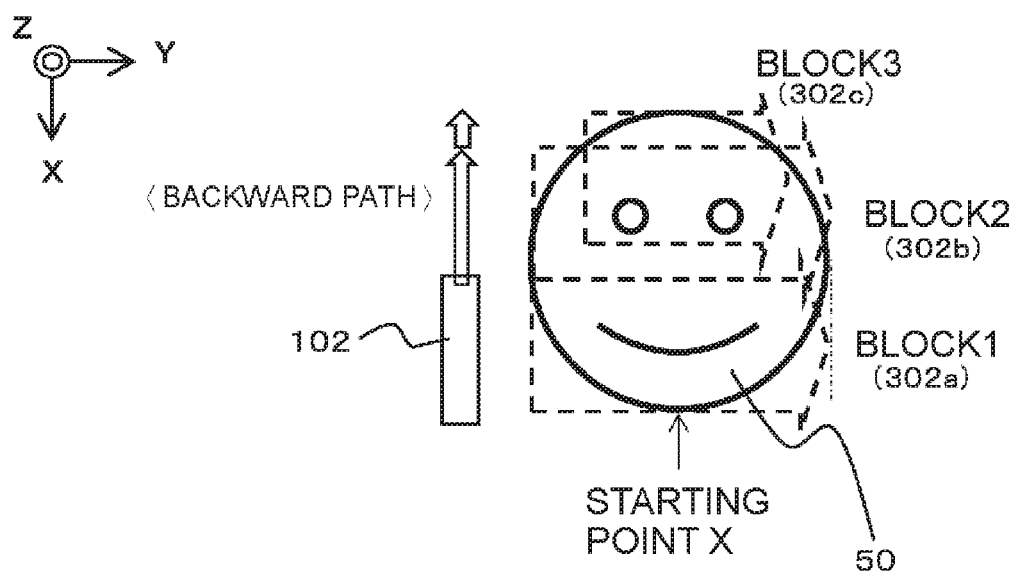

In a modification of the operation illustrated with reference to FIGS. 5A and 5B, for example, how the second sub-scan is performed may be modified. FIGS. 6A and 6B illustrate a modification of how the second sub-scan is performed. FIGS. 6A and 6B illustrate an example of the second sub-scan in the forward path and the backward path in this modification. The operation illustrated in FIGS. 6A and 6B are identical or similar to the operation illustrated in FIGS. 5A and 5B, except the points described below.

In this modification, for example, for the second sub-scan corresponding to the second sub-scan performed when moving from the block 302b (block 2) to the block 302c (block 3) in FIG. 5A, as illustrated in FIG. 6A, the amount of movement is reduced to be matched with the range of the object. In this configuration, for example, in forming the next layer, the main scanning operation for the block 302a (block 1) illustrated in FIG. 6B can be started without moving in the sub scanning direction. In this case, also for the second sub-scan performed last in the operation illustrated in FIG. 6B, the amount of movement is reduced to be matched with the range of the object, in the same manner as in the case illustrated in FIG. 6A. In this configuration, for example, the moving distance of the inkjet head 102 in the sub scanning direction can be reduced. Accordingly, for example, the object 50 can be built more efficiently. In addition, for example, the building apparatus 10 can be reduced in size.

Figure 7A:
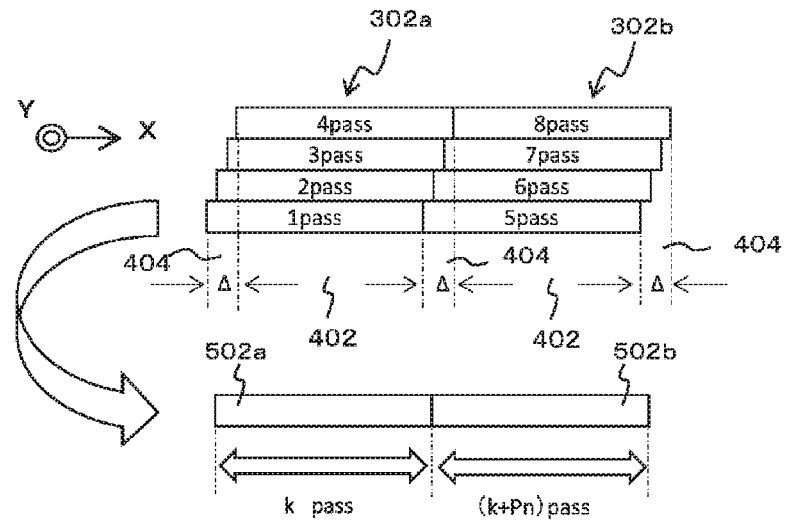
Figure 7B:
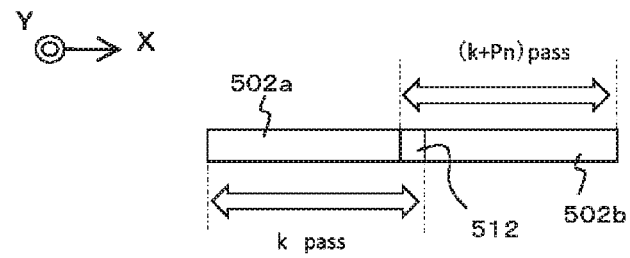
Figure 7C:
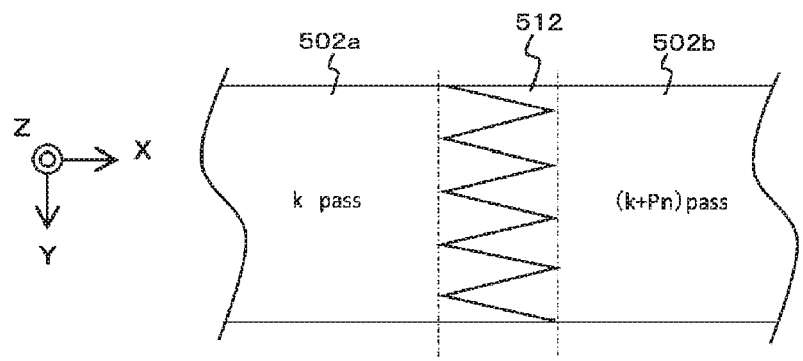

In connection with the operation of the small pitch pass method, a modification of the manner of forming blocks will be described. FIGS. 7A to 7C are diagrams illustrating a modification of the manner of forming blocks. The operation of forming a block in this modification is identical or similar to the operation described with reference to FIGS. 1A to 1C to FIGS. 6A and 6B, except the points described below.

FIG. 7A is a reference diagram for explaining the modification described below, specifically illustrating the manner of forming blocks described above with reference to, for example, FIGS. 3A to 3C and FIGS. 4A and 4B, in connection with the operation of forming a block in a way different from this modification. In the operation described with reference to, for example, FIGS. 3A to 3C and FIGS. 4A and 4B, a block having the intermediate region 402 and the end regions 404 is formed as a block (for example, blocks 302a, 302b) that forms one layer of ink, as explained above. In this case, adjacent blocks are formed such that the end regions 404 overlap each other.

However, in this case, when an attention is focused on the main scanning operations in the same turn, of the main scanning operations of the number of passes Pn performed to form adjacent blocks, the boundary (the boundary between passes) between the ejection target regions which are regions formed in individual main scanning operations is linear parallel to the main scanning direction. In this case, the ejection target region refers to, for example, a region in which the inkjet head ejects ink in each main scanning operation, and is set within the region in which the nozzle row in the inkjet head passes in each main scanning operation.

In this case, "the main scanning operation in the same turn" refers to, for example, the main scanning operation in the same position in a sequence starting from the initial main scanning operation, of a plurality of main scanning operations performed to form each block. More specifically, for example, as illustrated in the lower side of FIG. 7A, when an attention is focused on the main scanning operation performed for the k-th time (k is an integer equal to or greater than 1 and equal to or less than Pn) to form each block, the main scanning operation performed for the k-th time for the first block 302a is the k-th main scanning operation (k pass) of all the main scanning operations performed to form one layer of ink. The main scanning operation performed for the k-th time for the second block 302b is the (k+Pn)th main scanning operation ((k+Pn) pass)) of all the main scanning operations. In this case, these two main scanning operations are the main scanning operations in the same turn.

In this case, "the boundary between the ejection target regions formed in the main scanning operations in the same turn (the boundary between passes) is linear parallel to the main scanning direction" means that, as illustrated in the lower side in FIG. 7A, a particular position in the sub scanning direction serves as the boundary for an ejection target region 502a corresponding to the main scanning operation performed for the k-th time and an ejection target region 502b corresponding to the main scanning operation performed for the (k+Pn)th time. In this case, it can be considered that ink is exclusively ejected to each position in the sub scanning direction, for the main scanning operations in the same turn in adjacent blocks. In this case, "ink is exclusively ejected to each position in the sub scanning direction" means that, for example, the main scanning operation of ejecting ink to each position in the sub scanning direction is either one of the main scanning operations in the same turn in adjacent blocks.

By contrast, in a modification of the manner of forming blocks, the main scanning operations in the same turn in adjacent blocks may be set such that ink is ejected to a region of the same range in both of the main scanning operations in the sub scanning direction. FIGS. 7B and 7C illustrate a modification of the manner of forming blocks.

In this case, "ink is ejected to a region of the same range in the sub scanning direction in both of the main scanning operations" means that, for example, for a region having a predetermined range in the sub scanning direction, ink is ejected to some ejection positions in the region in one of the main scanning operations, and ink is ejected to other ejection positions in the region in the other main scanning operation. Such operation can be considered as the operation of ejecting ink complementarily by the main scanning operations in the same turn in adjacent blocks, for a region having a predetermined range in the sub scanning direction.

In this case, the ejection target regions 502 in the main scanning operations in the same turn in adjacent blocks may be set so as to partially overlap in the sub scanning direction, as in an interlaced region 512 in FIG. 7B. In this case, the interlaced region 512 is set, for example, in part of the end region of a block. More specifically, in the case illustrated in FIG. 7B, an ejection target region 502a corresponding to the main scanning operation performed for the k-th time and an ejection target region 502b corresponding to the main scanning operation performed for the (k+Pn)th time are arranged side by side so as to share the interlaced region 512.

In this case, the interlaced region 512 may be considered as a region in which the emission density for ejecting ink in each main scanning operation is lower than in the other part. In this case, for example, through two main scanning operations including the interlaced region 512 as the ejection target region, dots of ink are formed with the same density as in one main scanning operation for the part other than the interlaced region 512. In this case, for example, in forming each block, the density at the ejection position in one main scanning operation for at least part of the end region of the block may be set lower than the density at the ejection position in the intermediate region of the block. In this case, "the density at the ejection position" refers to the density at the ejection position to which the inkjet head ejects ink in one main scanning operation. In this case, at least part of the end region between two adjacent blocks can be formed by, in total, 2Pn main scanning operations, where Pn main scanning operations are performed for each block.

In this case, the manner of forming the interlaced region 512 at the end region of a block can be considered as, for example, a method of using a pattern for selecting an ejection position such that the interlaced region 512 is formed complementarily (in an interlaced manner) in forming adjacent two blocks. In this case, the pattern for use in forming the interlaced region 512 is, for example, a pattern that specifies an ejection position to which ink is ejected in each main scanning operation, from all the ejection positions in the interlaced region 512. More specifically, in this case, for example, the area of the interlaced region 512 may be divided into halves, which are then distributed to the ejection target regions in the adjacent blocks (the area dividing method).

FIG. 7C schematically illustrates an example of the detailed configuration of the interlaced region 512 in a case where the interlaced region 512 is formed by the area dividing method. In this case, for a plurality of ejection target regions 502a and 502b that overlap the interlaced region 512 in adjacent blocks, as illustrated in the figure, the end portions are changed in a jagged pattern along the main scanning direction. The interlaced region 512 is thus formed complementarily through two main scanning operations corresponding to the ejection targets regions 502a and 502b.

The end portions of the ejection target regions 502a and 502b may be changed in any shape other than a jagged pattern. For example, the end portions of the ejection target regions 502a and 502b may be changed in a wavy pattern, rather than the illustrated jagged pattern. Alternatively, the end portions may be formed in a variety of shapes in non-parallel to the main scanning direction.

Figure 8A:
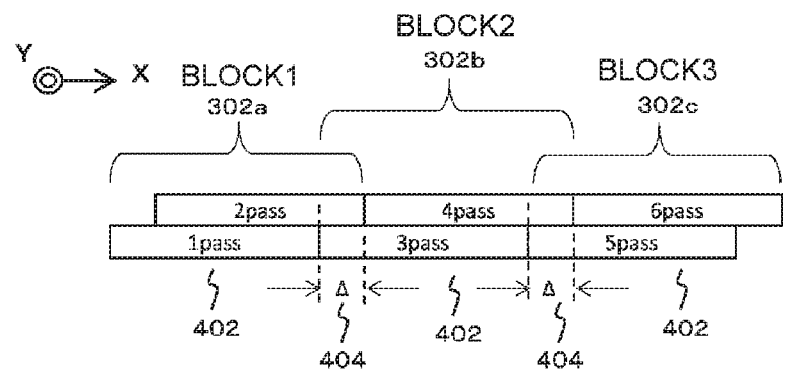
Figure 8B:
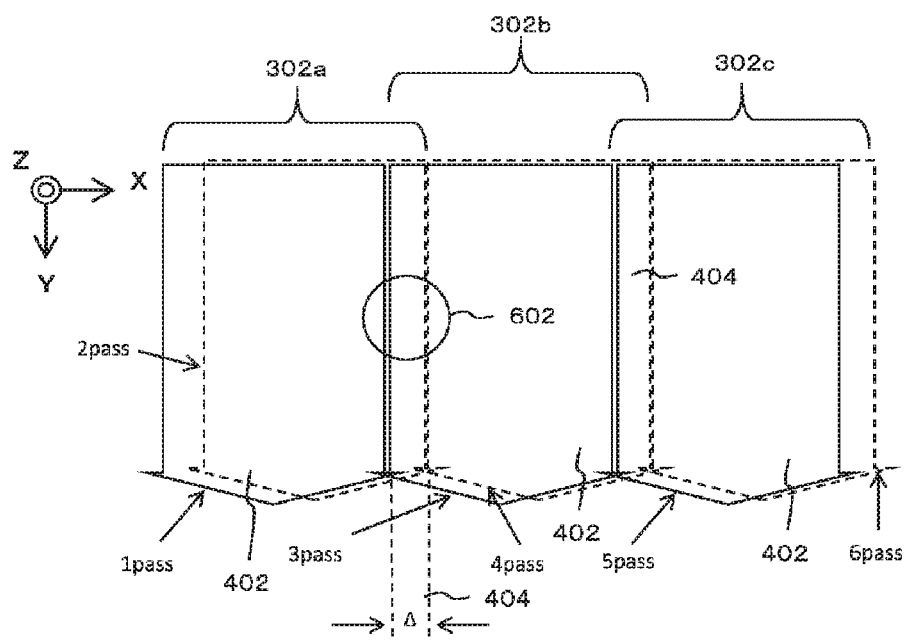
Figure 8C:
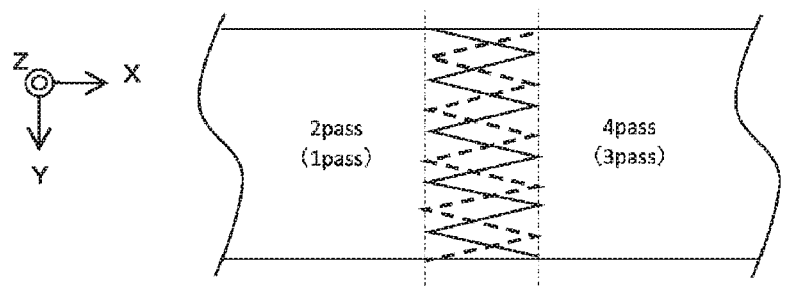

When the interlaced region 512 is formed in this way, it is preferable that the interlaced regions 512 overlap among a plurality of layers of ink deposited, such that the interlaced regions 512 in the same state not overlap each other in succession. FIGS. 8A to 8C illustrate the manner of forming interlaced regions 512 for a plurality of layers of ink deposited in succession. FIGS. 8A and 8B illustrate an example of the position where individual main scanning operations are performed (the position in the sub scanning direction), for the main scanning operations performed when a layer of ink including a plurality of blocks 302a to 302c is formed. FIG. 8C is an enlarged view schematically illustrating the portion denoted by a circle 602 in FIG. 8B.

FIGS. 8A to 8C illustrate a case where the number of times of the main scanning operation (the number of passes Pn) is two when each individual block is formed, for simplicity of illustration and explanation. In this case, the odd-numbered main scanning operations or the even-numbered main scanning operations form one interlaced region, for example, in the adjacent blocks 302a and 302b.

Also in this case, the sub scanning operation (first sub-scan) with a feed amount of a small pitch is performed in the interval of the main scanning operations performed to form one block. In addition, for the ejection target regions in the main scanning operations in the same turn in adjacent blocks, the end portion is changed to a jagged pattern in a manner identical or similar to the case illustrated in FIG. 7C. Therefore, in this case, part of the end region 404 between blocks is the interlaced region. In this case, it is preferable that the width of the interlaced region in the sub scanning direction be set to about 5 mm (for example, about 3 to 8 mm).

When an object is built by additive manufacturing, layers of ink including such interlaced regions are successively added. Then, in this case, for example, if interlaced regions in the same state overlap each other in a plurality of layers of ink deposited, the boundary between blocks may become noticeable. In this respect, also in this case, the manners of forming the corresponding interlaced region are differentiated from each other between two layers of ink continuously overlapping in the deposition direction, thereby preventing noticeability of the boundary between blocks more appropriately. In this case, "the corresponding interlaced region between two layers of ink" is the interlaced region formed by the main scanning operation at a corresponding timing in forming the corresponding block. The "main scanning operation performed at a corresponding timing" is the main scanning operation in the same turn, of the main scanning operations of the number of passes.

In this case, "the manners of forming the corresponding interlaced region are differentiated from each other" means, for example, that the manners of forming the end portion in the sub scanning direction are differentiated from each other for the ejection target regions overlapping at the interlaced region. More specifically, the manners of forming the end portion may be differentiated from each other, for example, such that when the end portion is formed in a jagged pattern, the shapes of the portions changed in a jagged pattern are differentiated from each other. In this case, for example, for the jagged pattern, the widths in the sub scanning direction may be differentiated from each other. Alternatively, for example, for the jagged pattern, the pitches or the sizes of projections and depressions may be differentiated from each other. Similarly, when an end portion in a wavy pattern other than a jagged pattern is formed, the shapes of the wavy portions may be differentiated from each other. The manner of forming the end portion may be differentiated, for example, by shifting the position in the sub scanning direction of the end portion of the ejection target region in the corresponding interlaced region, between two layers of ink. These configurations can prevent, for example, noticeability of the boundary between blocks more appropriately.

Figure 9A:
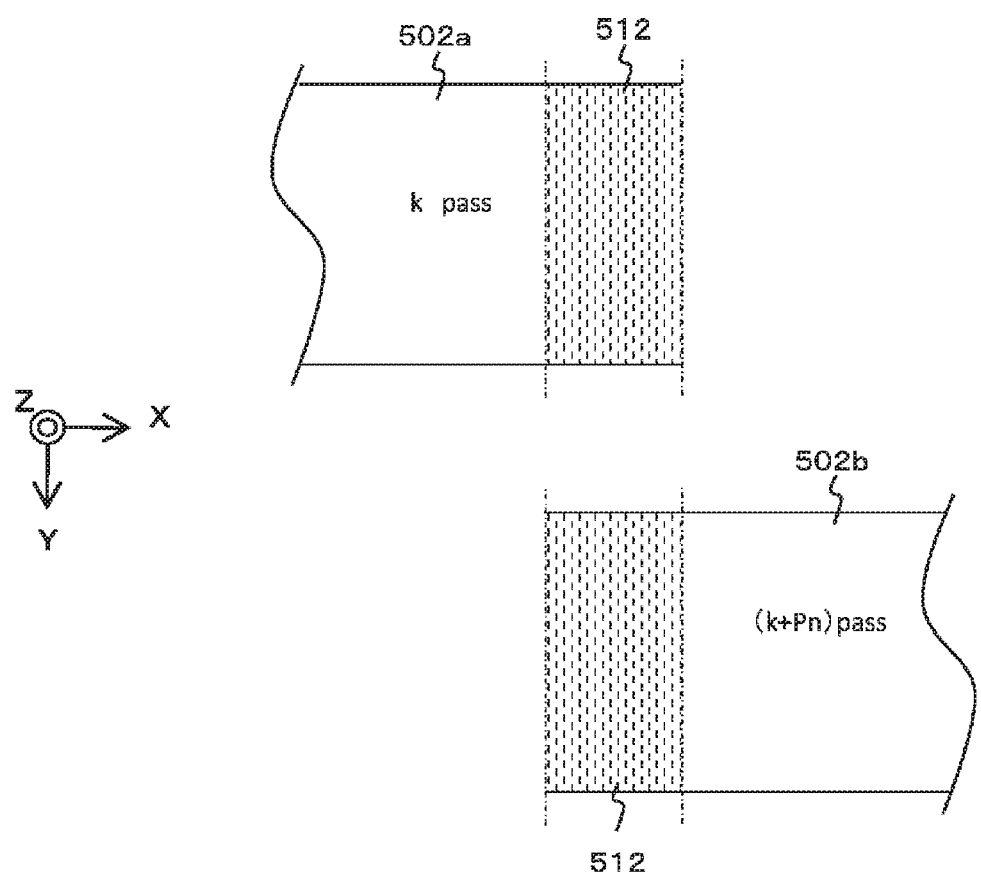
FIGS. 9A and 9B are diagrams illustrating a modification of the manner of forming the interlaced region 512, in which FIG. 9A schematically illustrates a modification of the manner of forming the interlaced region 512.
Figure 9B:
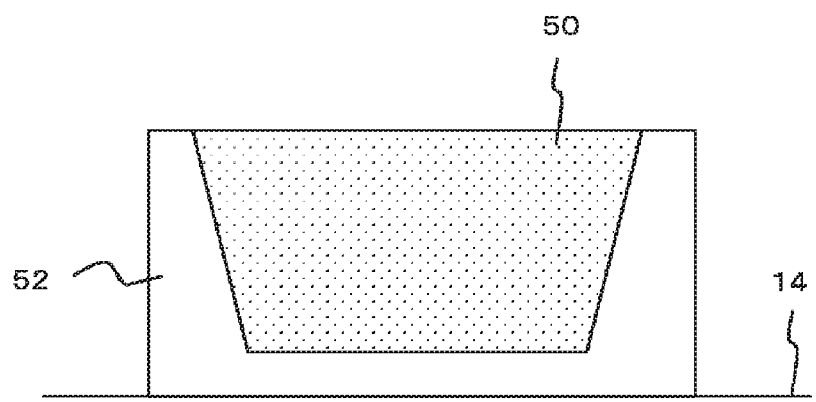

A modification of the manner of forming the interlaced region 512 and the operation of the building apparatus 10 (see FIGS. 1A to 1C) will now be further elaborated. FIGS. 9A and 9B are diagrams illustrating a modification of the manner of forming the interlaced region 512. FIG. 9A schematically illustrates the manner of forming the interlaced region 512.

In the foregoing, the operation of forming the interlaced region 512 by the area dividing method has mainly been described with reference to, for example, FIGS. 7A to 7C and FIGS. 8A to 8C. The interlaced region 512, however, may be formed by a method other than the area dividing method. In this case, as illustrated in the ejection target region 502a in the k-th main scanning operation and the ejection target region 502b in the (k+Pn)th main scanning operation as depicted by a shaded pattern in FIG. 9A, in the setting of the pattern for ejecting ink to the ejection positions in the interlaced region 512, a complementary pattern other than the area dividing method of forming the end portion in a jagged pattern may be set.

In this case, the complementary pattern may be formed, for example, by a method of dividing the inside of the interlaced region 512 alternately in the sub scanning direction (X-direction interlaced method) or a method of dividing the inside of the interlaced region 512 alternately in the main scanning direction (Y-direction interlaced method). In this case, "dividing the inside of the interlaced region 512" means that the main scanning operation to form a unit of line with a width of minimum unit of the resolution of building, in the sub scanning direction or the main scanning direction, is alternately assigned to two main scanning operations for forming the interlaced region 512. Also in this configuration, the interlaced region 512 can be formed appropriately.

When the interlaced region 512 is formed in these manners, it is preferable that the settings of a pattern used for forming the corresponding interlaced region 512 may be differentiated from each other between two layers of ink continuously overlapping in the deposition direction. In this configuration, for example, the manner of forming the end region of a block can be appropriately differentiated between two layers of ink.

A supplemental description for the support layer 52 formed on the periphery of the object 50 during building will be given in conjunction with the operation of the building apparatus 10. FIG. 9B is a diagram illustrating the manner of forming the support layer 52 in more detail. As explained above, when the object 50 is formed by the building apparatus 10, ink is ejected onto the stage 14 whereby layers of ink are successively added. In this case, the support layer 52 is formed on the periphery of the object 50 as necessary.

In this case, for example, the support layer 52 serving as a base material for the object 50 may be formed on the stage 14 and under the object 50 (between the stage 14 and the object 50). With such a configuration, for example, even when minute projections and depressions are present on the stage 14, their effects can be suppressed appropriately. In this case, the material of the support layer 52 is deposited up to the height that reaches the planarizing roller in the head 12 (see FIGS. 1A to 1C) of the building apparatus 10 to fill the gap in which the planarizing roller does not work, so that planarization with the planarizing roller can be performed appropriately after the start of formation of the object 50. Accordingly, for example, the object 50 can be built with higher accuracy.

In the building apparatus 10, the inkjet heads in the head 12 may be configured such that the volume of droplets of ink ejected is variable in a plurality of levels (variable heads). In this configuration, for example, the volume of droplets of ink can be adjusted variably as necessary in forming the parts of the object 50. More specifically, for example, in forming a colored region in the object 50, a variable volume of droplets of ink enables coloring with higher accuracy.

In this case, for example, for a part formed to be filled with a single kind of ink, such as the support layer 52, ink may be ejected with the maximum volume of droplets ejected. In this case, in particular, for a part of the support layer 52 that is formed under the object 50, it is preferable that ink be ejected with the maximum volume of droplets. With this configuration, for example, the operation of depositing the material of the support layer 52 up to the height that reaches the planarizing roller in the head 12 can be performed in a shorter time. Accordingly, for example, the time required for building can be reduced more appropriately.

The gap in which the planarizing roller does not work on the stage 14 is, for example, a gap having a width of about 200 m. The operation of filling this gap with the material of the support layer 52 may be performed, for example, with the settings identical or similar to those in building the body of the object 50. More specifically, in this case, for example, the operation of depositing the material of the support layer 52 under the object 50 may be performed at the same resolution as in building the body of the object 50.

The operation of depositing the material of the support layer 52 under the object 50 may be performed with settings different from those in building the body of the object 50, because, for example, forming the support layer 52 at a resolution lower than that of the object 50 is less likely to cause a problem. In this case, for example, the resolution of building may be set lower than that in building the body of the object 50. More specifically, in this case, for example, the operation of depositing the material of the support layer 52 under the object 50 may be performed at a resolution of about 300 dpi, and the body of the object 50 may be built at a resolution of about 600 dpi.

INDUSTRIAL APPLICABILITY

The present disclosure can be suitably used for, for example, a building apparatus.

What is claimed is:
1. A building apparatus that builds a three-dimensional object by depositing layers of a building material in a deposition direction which is preset, the building apparatus comprising:
an ejection head, configured to eject the building material; and
a scan driver, configured to cause the ejection head to perform a scanning operation of moving relative to the three-dimensional object being built,
wherein
the scan driver causes the ejection head to perform, as the scanning operation,
a main scanning operation of ejecting the building material while moving relative to the three-dimensional object being built in a main scanning direction orthogonal to the deposition direction and
a sub scanning operation of moving relative to the three-dimensional object being built in a sub scanning direction orthogonal to the deposition direction and the main scanning direction,
in an operation of forming one of the layers formed of the building material, the scan driver causes the ejection head to perform the main scanning operation a preset number of times Pn for each position of the layer being built, where Pn is an integer equal to or greater than two,
the ejection head has a nozzle row including a plurality of nozzles arranged in a row for ejecting the building material,
when building the three-dimensional object at least having a size in the sub scanning direction larger than a nozzle row width that is a width of the nozzle row in the sub scanning direction, the scan driver causes the ejection head to form, as the one of the layers, a layer configured such that a plurality of blocks are arranged in the sub scanning direction, the blocks each being a region formed by performing the Pn main scanning operations,
each of the blocks that constitute the one of the layers includes an intermediate portion of the block in the sub scanning direction and has an intermediate region and an end region, the intermediate region being a region that does not overlap in position with another block, the end region being a region at an end of the block in the sub scanning direction and overlapping with an adjacent block in at least part of a range in the sub scanning direction, and
for at least part of the layers deposited in the deposition direction, a manner of forming the end region in a corresponding block is differentiated between two of the layers continuously overlapping in the deposition direction;
wherein the block has a range corresponding to the nozzle row width in the sub scanning direction;
the scan driver is configured so that, a manner of forming the end region is differentiated between two of the layers continuously overlapping in the deposition direction, by shifting a position of the end region in the sub scanning direction for the corresponding block; and
a width of shifting the position of the end region in the sub scanning direction in each time of the main scanning operation is made smaller than a width in a normal pitch pass method obtained by dividing the width of the block by a number of a plurality of the layers.
2. The building apparatus according to claim 1, wherein a manner of forming the end region is differentiated between two of the layers continuously overlapping in the deposition direction, by differentiating a width of the end region in the sub scanning direction for the corresponding block.
3. The building apparatus according to claim 1, wherein in forming each of the blocks, a density at an ejection position to which the scan driver causes the ejection head to eject the building material in a single main scanning operation for at least part of the end region is set lower than a density at an ejection position to which the scanning driver causes the ejection head to eject the building material in a single main scanning operation for the intermediate region, to form at least part of the end region through the main scanning operation performed a number of times 2Pn while adjacent two blocks are formed, and a manner of forming the end region is differentiated between two of the layers continuously overlapping in the deposition direction, by differentiating setting of a pattern for ejecting the building material to each of the ejection positions in the end region, between the corresponding blocks in two of the layers continuously overlapping in the deposition direction.

4. The building apparatus according to claim 1, wherein in each main scanning operation, the scan driver causes the ejection head to eject the building material to an ejection target region set in a region in which the nozzle row in the ejection head passes through, the ejection target region is set such that an end portion in the sub scanning direction is non-parallel to the main scanning direction, and a manner of forming the end region is differentiated by differentiating a manner of forming the end portion in the sub scanning direction, for the ejection target region to which the building material is ejected in the main scanning operation performed at a corresponding timing in forming the corresponding block, between two of the layers continuously overlapping in the deposition direction.

5. The building apparatus according to claim 4, wherein a manner of forming the end portion in the sub scanning direction is differentiated, for the ejection target region to which the building material is ejected in the main scanning operation performed at a corresponding timing in forming the corresponding block, between two of the layers continuously overlapping in the deposition direction, by shifting a position of the end position in the sub scanning direction.

6. The building apparatus according to claim 4, wherein an end portion in the sub scanning direction of the ejection target region is formed so as to be changed in a jagged pattern or a wavy pattern along the main scanning direction, and a manner of forming the end portion in the sub scanning direction is differentiated, for the ejection target region to which the building material is ejected in the main scanning operation performed at a corresponding timing in forming the corresponding block, between two of the layers continuously overlapping in the deposition direction, by differentiating a width in the sub scanning direction of a portion changed in the jagged pattern or wavy pattern in the end portion.

7. The building apparatus according to claim 1, wherein in an operation of forming one of the layers, the scan driver causes the ejection head to perform, as the sub scanning operation, a first sub-scan that is the sub scanning operation performed in an interval of the Pn main scanning operations performed for forming one of the blocks, and a second sub-scan that is the sub scanning operation performed after performing the Pn main scanning operations for forming the one of the blocks and before performing the main scanning operation for forming the next block, and an amount of movement of the ejection head moving relative to the three-dimensional object being built in the sub scanning direction in the first sub-scan is smaller than an amount of movement of the ejection head moving relative to the three-dimensional object being built in the sub scanning direction in the second sub-scan.

8. The building apparatus according to claim 7, wherein the amount of movement of the ejection head moving relative to the three-dimensional object being built in the sub scanning direction in the first sub-scan is smaller than a width obtained by dividing the nozzle row width by the number of times Pn.

9. The building apparatus according to claim 7, wherein the amount of movement of the ejection head moving relative to the three-dimensional object being built in the sub scanning direction in the second sub-scan is a distance corresponding to the nozzle row width.

10. The building apparatus according to claim 7, wherein the scan driver causes the ejection head to perform the first sub-scan in an interval of the Pn main scanning operations performed for forming one of the blocks, and the scan driver causes the ejection head to move in one direction of the sub scanning direction relative to the three-dimensional object being built, in the first sub-scan performed after any one of the main scanning operations, and causes the ejection head to move in another direction of the sub scanning direction relative to the three-dimensional object being built, in the first sub-scan performed after another of the main scanning operations.

11. The building apparatus according to claim 7, wherein in forming each of the layers deposited in the deposition direction, the scan driver sets a position of the ejection head in the sub scanning direction at start of the initial main scanning operation to be matched with a range in the sub scanning direction of a region in which the layer is to be formed.

12. The building apparatus according to claim 7, wherein the scan driver alternately changes a direction in which the ejection head is moved relative to the three-dimensional object being built in the second sub-scan, for each of the layers deposited in the deposition direction.

13. A building method for building a three-dimensional object by depositing layers of a building material in a deposition direction which is preset, the building method comprising:

causing an ejection head configured to eject the building material to perform a scanning operation of moving relative to the three-dimensional object being built;

causing the ejection head to perform, as the scanning operation, a main scanning operation of ejecting the building material while moving relative to the three-dimensional object being built in a main scanning direction orthogonal to the deposition direction and a sub scanning operation of moving relative to the three-dimensional object being built in a sub scanning direction orthogonal to the deposition direction and the main scanning direction;

in an operation of forming one of the layers formed of the building material, causing the ejection head to perform the main scanning operation a preset number of times Pn for each position of the layer being built, where Pn is an integer equal to or greater than two, the ejection head having a nozzle row including a plurality of nozzles arranged in a row for ejecting the building material;

when building the three-dimensional object at least having a size in the sub scanning direction larger than a nozzle row width that is a width of the nozzle row in the sub scanning direction, causing the ejection head to form, as one of the layers, a layer configured such that a plurality of blocks are arranged in a row in the sub scanning direction, the blocks each being a region formed by performing the Pn main scanning operations, wherein each of the blocks that constitute one of the layers includes an intermediate portion of the block in the sub scanning direction and has an intermediate region and an end region, the intermediate region being a region that does not overlap in position with another block, the end region being a region at an end of the block in the sub scanning direction and overlapping with an adjacent block in at least part of a range in the sub scanning direction; and for at least part of the layers deposited in the deposition direction, differentiating a manner of forming the end region in a corresponding block between two of the layers continuously overlapping in the deposition direction;

wherein the block has a range corresponding to the nozzle row width in the sub scanning direction;

a manner of forming the end region is differentiated between two of the layers continuously overlapping in the deposition direction, by shifting a position of the end region in the sub scanning direction for the corresponding block; and a width of shifting the position of the end region in the sub scanning direction in each time of the main scanning operation is made smaller than a width in a normal pitch pass method obtained by dividing the width of the block by a number of a plurality of the layers.

* * * * *